US008230445B2

(12) United States Patent
Hope et al.

(10) Patent No.: US 8,230,445 B2
(45) Date of Patent: Jul. 24, 2012

(54) EVENT MANAGEMENT METHOD AND SYSTEM

(75) Inventors: Clifford C. Hope, London (GB); Christopher C. Massey, Alton (GB); Richard Turner, Falmouth (GB)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 11/481,570

(22) Filed: Jul. 6, 2006

(65) Prior Publication Data

US 2007/0067773 A1 Mar. 22, 2007

Related U.S. Application Data

(63) Continuation-in-part of application No. 10/342,447, filed on Jan. 14, 2003, now abandoned, and a continuation-in-part of application No. 10/342,440, filed on Jan. 14, 2003, now abandoned, and a continuation-in-part of application No. 10/342,442, filed on Jan. 14, 2003, now abandoned, and a continuation-in-part of application No. 10/342,443, filed on Jan. 14, 2003, now abandoned, and a continuation-in-part of application No. 10/342,432, filed on Jan. 14, 2003, now abandoned, and a continuation-in-part of application No. 10/342,445, filed on Jan. 14, 2003, now abandoned, and a continuation-in-part of application No. 10/342,438, filed on Jan. 14, 2003, now abandoned, and a continuation-in-part of application No. 10/342,446, filed on Jan. 14, 2003, now abandoned.

(51) Int. Cl.
*G06F 3/00* (2006.01)
*G06F 15/16* (2006.01)

(52) U.S. Cl. ........ 719/318; 709/203; 709/219; 709/217; 709/202

(58) Field of Classification Search .................. 709/203, 709/206, 207, 219, 231, 202, 217; 719/318; 718/100; 705/28
See application file for complete search history.

(56) References Cited

U.S. PATENT DOCUMENTS

| 5,596,750 A | | 1/1997 | Li et al. |
| 5,706,516 A | * | 1/1998 | Chang et al. ................. 719/314 |
| 5,721,825 A | * | 2/1998 | Lawson et al. ............... 709/203 |
| 5,902,352 A | | 5/1999 | Chou et al. |
| 5,944,782 A | | 8/1999 | Noble et al. |
| 6,154,766 A | | 11/2000 | Yost et al. |
| 6,167,448 A | | 12/2000 | Hemphill et al. |
| 6,173,310 B1 | | 1/2001 | Yost et al. |

(Continued)

OTHER PUBLICATIONS

COGNOS® Announces Wireless, Event-Driven Business Intelligence with Cognos NoticeCast™, news release, Burlington, MA, Nov. 12, 2001 cognos.com/news/releases/2001/1112_2.html, 3 pages, printed Dec. 27, 2004.

(Continued)

*Primary Examiner* — Gregory Todd
(74) *Attorney, Agent, or Firm* — Shumaker & Sieffert, P.A.

(57) ABSTRACT

Method and system in an event management system is disclosed. The method includes the step of creating an agent on a server in an event management system for monitoring an event. The event is present when a data achieving a predefined status defined by a business rule. The event management system includes a data source for generating the notification. The method further includes the steps of running the agent according to a schedule; generating the notification upon occurring of the event.

19 Claims, 15 Drawing Sheets

U.S. PATENT DOCUMENTS

| | | | |
|---|---|---|---|
| 6,195,795 B1 | 2/2001 | Block et al. | |
| 6,260,050 B1 | 7/2001 | Yost et al. | |
| 6,269,393 B1 | 7/2001 | Yost et al. | |
| 6,279,033 B1 | 8/2001 | Selvarajan et al. | |
| 6,292,099 B1 | 9/2001 | Tse et al. | |
| 6,311,175 B1 | 10/2001 | Adriaans et al. | |
| 6,366,926 B1 | 4/2002 | Pohlmann et al. | |
| 6,408,259 B1 | 6/2002 | Goebel et al. | |
| 6,446,136 B1 | 9/2002 | Pohlmann et al. | |
| 6,470,398 B1* | 10/2002 | Zargham et al. | 719/318 |
| 6,477,667 B1 | 11/2002 | Levi et al. | |
| 6,493,755 B1* | 12/2002 | Hansen et al. | 709/224 |
| 6,604,104 B1 | 8/2003 | Smith | |
| 6,631,363 B1* | 10/2003 | Brown et al. | 707/1 |
| 6,658,453 B1* | 12/2003 | Dattatri | 709/202 |
| 6,677,861 B1* | 1/2004 | Henry et al. | 340/855.3 |
| 6,763,380 B1* | 7/2004 | Mayton et al. | 709/224 |
| 6,775,658 B1* | 8/2004 | Zothner | 706/47 |
| 7,020,869 B2* | 3/2006 | Abrari et al. | 717/108 |
| 7,177,859 B2* | 2/2007 | Pather et al. | 707/3 |
| 2002/0062334 A1* | 5/2002 | Chen et al. | 709/200 |
| 2002/0080948 A1* | 6/2002 | Canali et al. | 379/229 |
| 2002/0083168 A1* | 6/2002 | Sweeney et al. | 709/224 |
| 2002/0163427 A1 | 11/2002 | Eryurek et al. | |
| 2002/0165997 A1 | 11/2002 | Hunsinger et al. | |
| 2002/0178226 A1* | 11/2002 | Anderson et al. | 709/206 |
| 2003/0058668 A1* | 3/2003 | Uchida | 363/59 |
| 2003/0101225 A1 | 5/2003 | Han et al. | |
| 2003/0105801 A1 | 6/2003 | Tse et al. | |
| 2003/0145124 A1 | 7/2003 | Guyan et al. | |
| 2003/0172077 A1* | 9/2003 | Moussavian | 707/100 |
| 2004/0002988 A1* | 1/2004 | Seshadri et al. | 707/102 |
| 2004/0128169 A1 | 7/2004 | Lusen | |
| 2004/0133610 A1* | 7/2004 | Flam et al. | 707/200 |
| 2005/0093881 A1 | 5/2005 | Okita et al. | |
| 2006/0235280 A1* | 10/2006 | Vonk et al. | 600/300 |

OTHER PUBLICATIONS

VISTA, "DHCP Health Level Seven (HL7) Developer Manual: Dynamic Addressing Supplement", Version 1.6*14, Jul. 1998, Department of Veterans Affairs Retrieved from the Internet at: va.gov/vdl/VistA-Lib/Infrastructure/Health_Level_7_(HL7)h171_6p14.pdf, 19 pages.

Event Tracker Complete Event Management, Prism Microsystems, Inc. eventlogmanager.com, 1 page, printed Jan. 5, 2005.

* cited by examiner

Figure 14

EVENT MANAGEMENT METHOD AND SYSTEM

RELATED APPLICATIONS

This application is a continuation-in-part of U.S. application Ser. No. 10/342,447, entitled "Dynamic Recipients in an Event Management System"; U.S. application Ser. No. 10/342,440, entitled "Trend Detection in an Event Management System"; U.S. application Ser. No. 10/342,442, entitled "Message Suppression in an Event Management System"; U.S. application Ser. No. 10/342,443, entitled "Iterative Escalation in an Event Management System"; U.S. application Ser. No. 10/342,432, entitled "Notification Service in an Event Management System"; U.S. application Ser. No. 10/342,445, entitled "Contextual Drill Through in an Event Management System"; U.S. application Ser. No. 10/342,438, entitled "Event Management System and Method"; and U.S. application Ser. No. 10/342,446, entitled "Autonomous Dynamic Behavior Modification In An Event Management System"; all filed on Jan. 14, 2003. The subject matter contained in the above applications is specifically incorporated herein by reference.

FIELD OF THE INVENTION

The present invention relates generally to corporate performance management (CPM) systems, and more particularly to event management method and system in CPM systems.

BACKGROUND OF THE INVENTION

Every business has events that create opportunities and risks. Some of these events are time-critical, requiring timely attention to prevent a lost opportunity. The greatest potential for maximizing opportunities or minimizing risks associated with time-critical business events may exist immediately after the event occurs.

Many events that affect a business are too dynamic to be modeled in any single operational system. For example, a stock-control system can be designed to place replenishment orders automatically when stocks are low, and when new stock is received to allocate it to outstanding customer orders according to one or more predetermined rules, such as oldest orders first or largest orders first. What the stock-control system will not be designed to take into account is that a particular customer has, over the last three months, received two faulty items, an incorrect final payment demand. Therefore, receipt of an order from that unsatisfied customer which cannot be fulfilled because an item is currently out of stock, is an event that the account manager needs to know about immediately in order to effectively manage the relationship with that customer. In this case, the business event that requires management is derived from multiple indicators spanning several systems.

In addition, many events over which there may be no direct control available but which have a direct impact. For example, movements in commodity prices or exchange rates can invalidate existing plans and forecasts. It would be advantageous for these external factors to be monitored so that forecasts can be revised if original assumptions are no longer valid.

Event management endeavors to assist in moving an issue forward to a sensible next step and conclusion, or "managing the event". An event management system (EMS) enables internal and external data from multiple disparate applications to be related and evaluated, making traditional data sources "event aware". Event management initiates appropriate actions upon detection of an event to ensure successful resolution of that event.

Many business intelligence (BI) applications perform some form of event management. Analysts model the anticipated events that will occur within the system, including anticipated exceptions, and apply a process for handling them. The system then deals with routine events and exceptions and produces reports on those it is not designed to handle.

BI applications are often used as rudimentary forms of event detection. Reports enable users to receive regular indications of business performance. Typically, the data on which they are reporting is derived from multiple sources and is loaded into a data warehouse and data marts by an extraction, transformation, and loading (ETL) tool. This data can often form the bedrock on which a company's strategies are based and subsequently monitored.

However, these traditional BI applications are not well suited to providing feedback on rapidly changing business conditions. Traditional reporting is fixed, not focused on the user. Furthermore, it is difficult to incorporate external data that may change frequently into data stores. The onus is still on the user to locate the data that directly affects them. The sheer volume of data available can result in more time, not less, being spent identifying important items that require action.

Early event management solutions included systems such as financial trading systems that created alarms, alerts, or warnings when stocks and commodities crossed a pre-determined threshold to alert the trader to take appropriate action. Other example is supply chain solutions, where there exist mechanisms by which appropriate people can be warned if, given the demand forecast and current inventory holding, unless stock is moved from warehouse A to warehouse B now, the forecasted demand at a given retail outlet won't be met because of the time taken to ship inventory.

These early event management systems have at least two problems in common. Firstly, they tend to be restricted to a single system and cover only a single process. Secondly, they are built into the application, and therefore are not flexible.

Modern EMS's now typically include business activity monitoring (BAM) capability. At its broadest level, BAM is the convergence of traditional business intelligence (BI) and real-time application integration. Information is drawn from multiple application systems and other sources, both internal and external, to provide a richer view of business activities and the potential to improve business decisions through availability of the latest information. BAM aims to reduce the time between information being captured in one place and being usable in another.

In a modern EMS there are generally three types of events to monitor and detect: notification events, which involve monitoring the availability of new report content; performance events, which involve monitoring changes to performance measures held in data sources; and operational events, which involve looking for events that occur in operational data.

An event may represent an important situation, therefore, there is a need for a system capable of reducing the time between information capture and use, and provide personalized delivery to suit the work patterns of the recipient. Such a system delivers data about the event to a recipient in a timely manner; enables users to view data from different angles to discover trends or inconsistencies; and reduces or eliminate duplicate or irrelevant message deliveries to ensure message content is always of the highest value, and provides support for desktop and mobile devices through electronic mail. The destination of the messages may be dependent on the real-time outcome of the business intelligence being monitored, i.e. the recipient is dependent on the monitored event.

Therefore, there is an unmet need for a system that can run agents to collect and bring critical information to the attention of users, rather than relying on users to find the critical information to react. Such a system should free users from the routine scanning of reports, creating time for them to investigate new areas. It should also improve efficiency by running reports by necessity, rather than by schedule. Such a system further automates the detection of critical business events, and by bringing together relevant information from multiple sources, and disseminate information to individual recipients or other business systems. Further, such a system monitors an event to ensure successful resolution and generate new BI information. By automatically monitoring events in real-time or on a schedule, an EMS can enable users to keep track of a greater number of events, and with a finer degree of granularity.

For the foregoing reasons, there is a need for an improved method and system for dynamic recipients in an event management system.

SUMMARY OF THE INVENTION

According to one aspect of the present invention there is provided a method for generating a notification. The method creates an agent on a server in an event management system for detecting an occurrence of an event and notifying of the occurrence of the event, the agent is software executable, the event occurs when data achieves a predefined status defined by a business rule; the event management system includes a data source for generating the notification; The method runs the agent according to the schedule; and generates the notification upon occurring of the event.

Preferably, the method stores values from the first notification in an event data store; compares values from a second notification to the stored values from the first notification, and suppresses the second notification when a predetermined element match.

Preferably, the method stores values event data from events in an event store; analyzes the stored event data, and determines the trends.

Preferably, the method invokes an escalating agent by the agent resulting in a second agent process, passes data from the first notification to the second agent process; and generates a second notification.

Preferably, the method updates the business rule based on other events.

Preferably, the method changes the schedule of the agent.

Preferably, the method further inserts a dynamic addressee placeholder into the notification; retrieves a second data from the data source; determines a dynamic addressee based on the second data; inserts an address of the determined dynamic addressee into the dynamic addressee placeholder; and transmits the notification to the addressee.

Preferably, the method filters events resulting in a significant event; and decides an action for the significant event.

More preferably, the significant event is filtered through an event absorption layer and decided in an event processing and filtering layer.

Preferably, the method customizes a delivery address and an appropriate format of the notification.

Preferably, the notification is a message.

Preferably, the notification is an electronic mail.

Preferably, the notification comprises a text message.

Preferably, the notification has support data.

Preferably, the data source is external.

Preferably, the data source is a relational database.

Preferably, the data is extracted according to a data mapping.

Preferably, the notification is sent to another business intelligence system to run another application.

According to another aspect of the present invention there is a storage medium readable by a computer encoding a computer program for generating a notification in an event management system, the computer program comprises: code means for creating an agent on a server in the event management system for detecting an occurrence of an event and notifying of the occurrence of the event, the agent is software executable running according to a schedule, the event occurs when data achieving a predefined status defined by a business rule; the event management system includes a data source for generating the notification; code means for running the agent according to the schedule; and code means for generating the notification upon occurring of the event.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

FIG. 14 illustrates an example of suppressing duplicate emails; and

DETAILED DESCRIPTION OF THE PRESENTLY PREFERRED EMBODIMENT

The present invention is directed to event management method and system.

Figure 1:
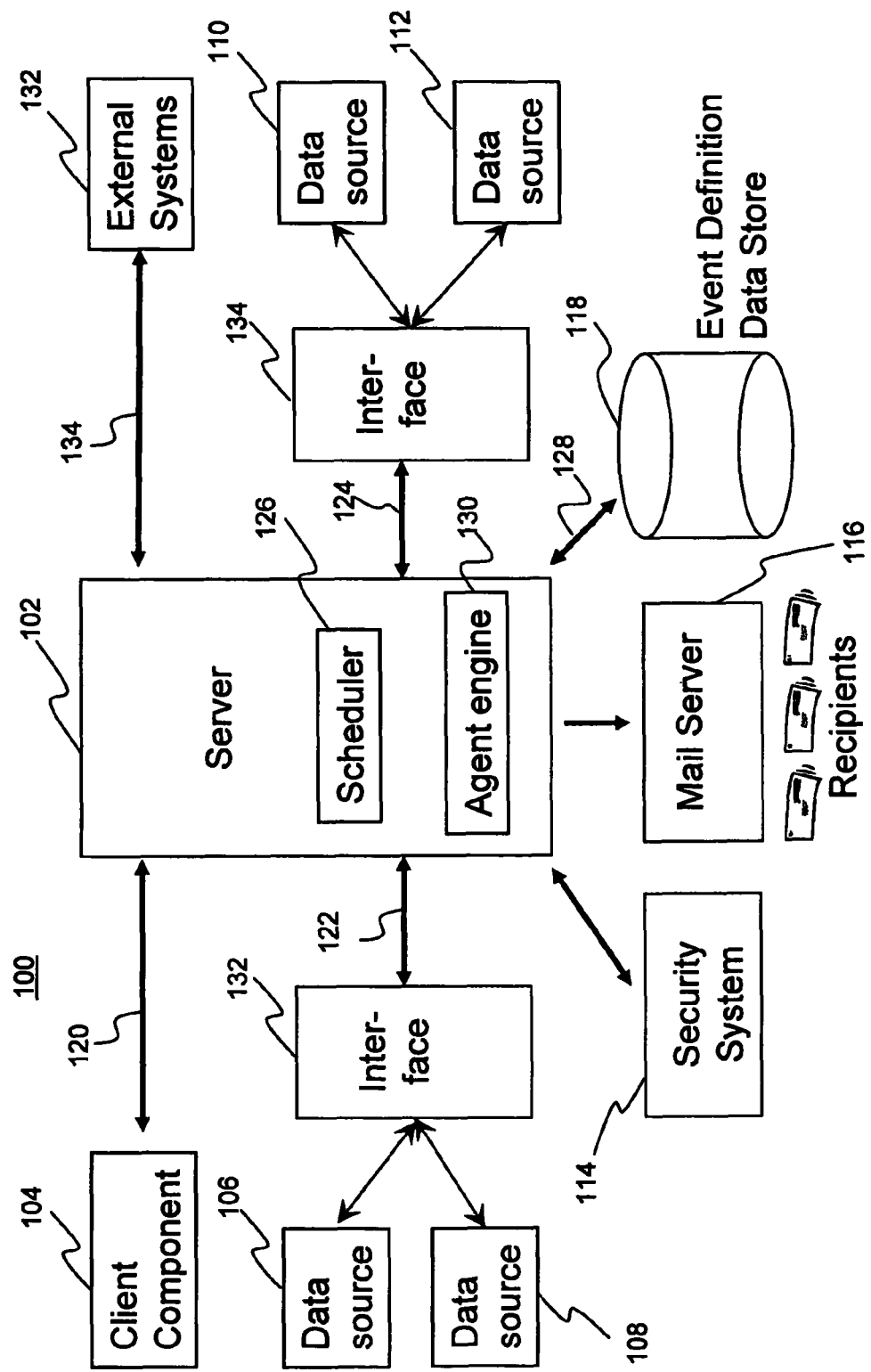
FIG. 1 illustrates an event management system architecture in accordance with an embodiment of the present invention.

Referring to FIG. 1, an event management system 100 with a server component 102, a client component 104 such as an authoring tool, data sources 106-112, a security system 114, a mail server 116, and event definition data store 118.

The server component 102 handles all communications 128 between the data store 118 and the authoring tool 104. The server component 102 includes a scheduler 126 that runs the agents. The communication 120 between the server component 102 and the authoring tool 104 may be through remote method invocation (RMI). The server component 102 retrieves and evaluates information from one or more data sources when an agent determines that a business event occurred.

The agent engine 130 for creating one or more agents, and the scheduler 126 for running the created agents are both located within the server component 102. An agent is a task that is run according to a schedule. The agent evaluates data items, defined by business information entity (BIE) topics retrieved from data sources according to a set of rules. A rule determines whether the data has achieved critical status, which is an event. Rules represent the business logic that is applied to the values of items within a data source in order to detect events. If the application of rules returns a result set, then the agent will typically construct a message and send it to appropriate recipients. An agent may invoke another agent. A message may contain text together with the actual values of the data evaluated within the rules, and any other support data that may be required to enable an action to be taken.

The data sources 106-112 may be any system that is to be interrogated to detect an event. Data sources may include financial, sales, CRM, ERP, or any other operational system within the organization used to manage operational processes. Some of these real time data sources may reside outside the organization, such as financial information, weather information, and business partners' systems. The server component 102 may use remote method invocation (RMI) 122, 124 and an interface 132, 134 to communicate with the data sources 106-112.

Any form of electronic data storage may also be considered as a data source that can be accessed by an agent. This includes databases, files, web pages and other computerized business systems. Examples for data sources include relational databases such as Oracle Rdb, Microsoft SQL Server, other data sources may be provided by applications such as Cognos PowerPlay®, Cognos Upfront®. A means of extracting the required data from a data source is defined within a data mapping. The data mapping definition will vary according to the underlying data source. All such data is defined within a Business Information Entity (BIE). BIE is a collection of information that is used to join the high level business view to the lower-level, technical definition of the corresponding data. BIE is built on data mapping, which in turn is built on a data source definition.

Agents are created and maintained by agent authors using the authoring tool. Agent authors use the client graphic user interface to create agents that monitor data sources 106-112 to detect the occurrence of a business event. When an agent detects a business event, the agent may send notifications in the form of email messages to one or more recipients. The authoring tool provides access to the items in the data source pool and to other shared objects stored in the data store, such as recipient profiles and schedules. Agent authors can set privileges to use objects based on defined user classes. In addition to the authoring tool, administration tool supports agent authors by providing access to the data store and creating a common data source pool, controls the scheduling service or scheduler, and views and maintains log files that contain information related to each agent.

The scheduler 126 initializes the process and the event management system 100, which delivers pertinent information about time-critical business conditions to the recipients who are best able to act upon it within a time frame that ensures the information can be exploited to maximum effect.

Figure 2:
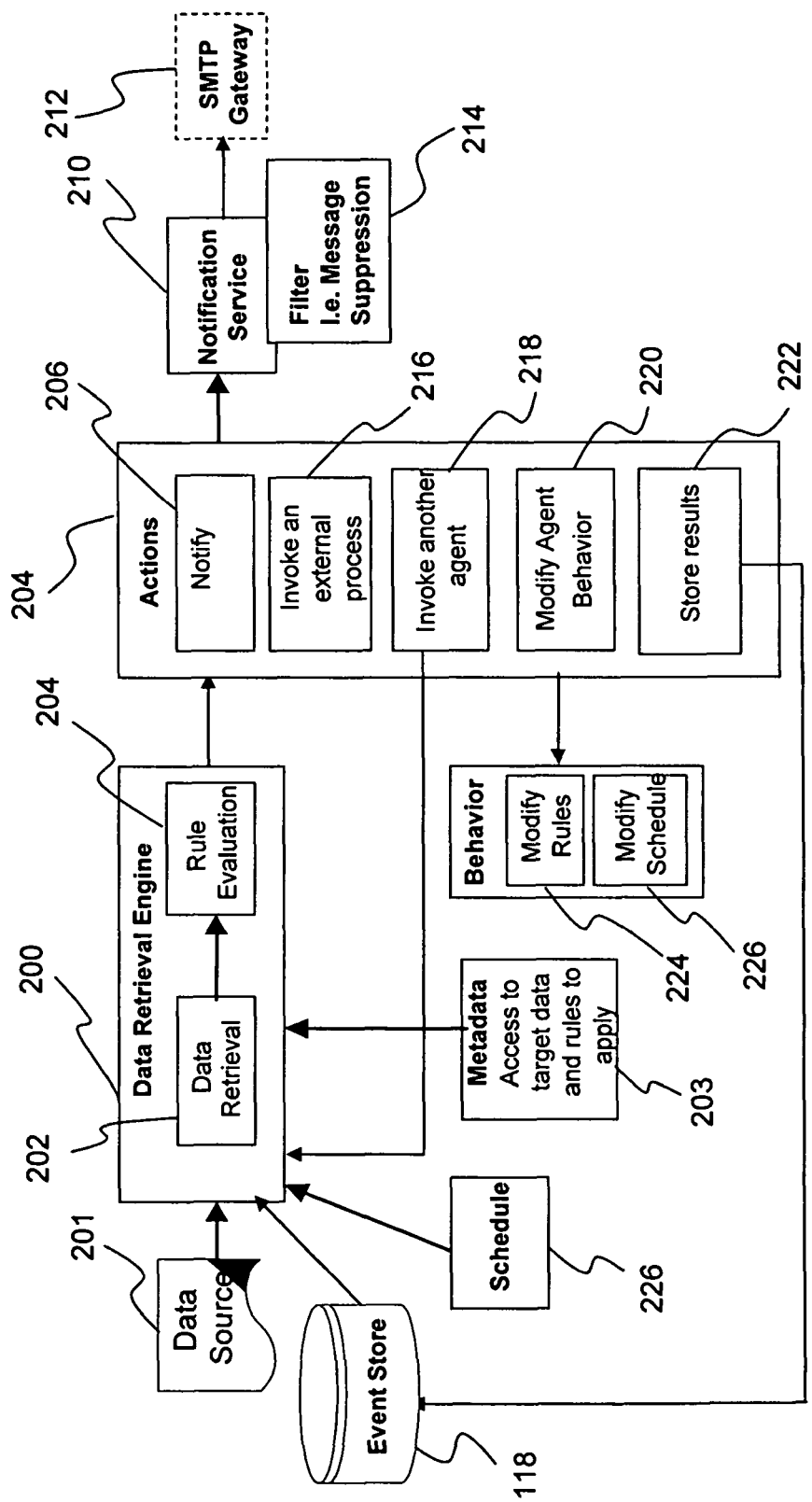
FIG. 2 illustrates the logical data flow of an agent in the event management system in accordance with an embodiment of the present invention.
Figure 3:
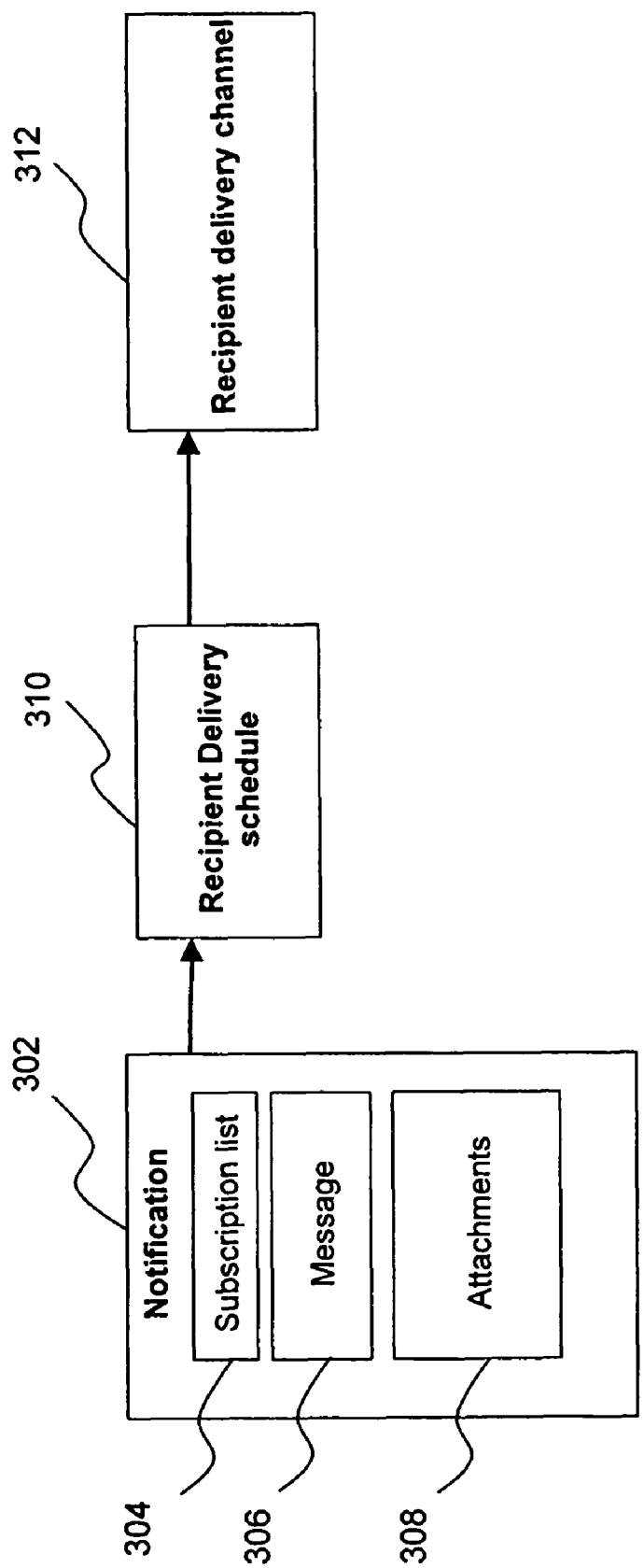
FIG. 3 illustrates an example of a notification.

FIG. 2 is a logical data flow of an agent in the event management system 100 in accordance with one embodiment of the present invention. The data retrieval engine in the event management system 100 uses agents to periodically retrieve 202 data 201, or metadata 203, and evaluate them according to a number of user-defined rules 204, scheduled according to the schedule 226. A rule determines whether or not the data has achieved a predefined status, such that an action is warranted 206. Such a condition is called an event. Referring also to FIG. 3, if an agent detects an event, it may assemble 208 a message 306 containing text together with the actual values of the data evaluated within the rule, any other supporting data 308 that may be required to enable action to be taken, by using a notification service 210. The message may include a URL for follow-up. The message is sent 212 to one or more recipients. The delivery may be based on a recipient delivery schedule 310. Since a recipient may have multiple email addresses such as work and personal emails for example the agent may select which address to use based on factors such as the day or time at which an event is detected.

A message may also be suppressed under certain circumstances 214. In an exemplary embodiment of the present invention, the future behavior of an agent can be modified after it detects a first event to avoid replicating messages about an ongoing event.

When an event occurs, the triggering condition is likely to be true for a period of time until action is taken to correct the condition. It would be irritating if agents sent repetitive messages about the same event. In order to avoid a flood of duplicate messaging occurring if an agent is running on a schedule, when a message is sent the topic values may be stored in an event store 118. Subsequently, when the values from the subsequent executions of the agent are compared to the stores value for the first event. If one or more predetermined elements in the topic values match, the system may suppress the message for subsequent events.

A variety of message delivery systems can be supported, including e-mail, SMS mobile phone text messages, web pages, and input to other business systems via XML or other similarly flexible language. Accordingly, recipients to messages may have access to multiple delivery channels 312.

Instead of transmitting an email to a recipient, an agent may send a message to another business intelligence system 216 to run another application. The event data may also be passed from one process to another for further analysis. The result of the event evaluation and the data values encountered may be saved as a source of further analytical data. The resulting store can then be used to provide information concerning the frequency of events or to predict future outcomes. Furthermore, by recording the outcome of each agent execution in an event result store new information may become available.

When an agent runs, it has a number of data values to evaluate. An evaluation indication shows the existence of an event. In either case; YES or NO can be written to a data store to provide a history. This history becomes another source for evaluation for use in such tasks as forecasting through extrapolation, making it possible to predict events in the future, frequencies of particular events, metadata, and/or occurrences of failures used for different elements of decisions.

Analyzing the frequency of the events, in contrast to dealing with individual occurrences of an event, can therefore help identify systematic failures of business processes. For example, having insufficient stock to meet current orders is an event that may need to be communicated to a sales manager and a purchasing clerk. But repeated occurrences of this situation may need to be communicated to the purchasing manager since it may indicate incorrect purchasing policy or a failing relationship with a supplier.

Furthermore, by applying predictive modeling techniques, this timeline can be extended into the future and ultimately used to predict critical events before they happen.

Agents may also invoke other agents 218 known as escalation agents, or launch an external process such as a batch file or executable, on the server computer as an alternative, or in addition to transmitting an email. Each agent then runs according to its own pre-defined schedule. Such agents may also be tasked to check other related data sources, or simply to check that the original critical condition was resolved within a reasonable time.

Having detected a business event, an agent can send a message, then launch an escalation agent and then stop. The escalation agent may re-check the original condition later and, if the condition still exists, may send an escalation message.

For example, a regional health authority collects data from general practitioners and hospitals concerning new cases of various communicable diseases. A report shows, amongst other things, the number of new cases in each disease category by area and compares them with expected numbers. Actual numbers that exceed the norms by a significant amount could indicate the possibility of an epidemic or the presence of a carrier in the area. An agent can run automatically on a data source update, enabling potential new outbreaks of disease to be identified within minutes. If any suspicious clusters are identified, the agent can for example launch two escalation agents: the first escalation agent receives disease and area information from the parent agent and uses those values to run a report showing case details by postal code. This report is available through email or universal resource locator (URL) to the health service officials. The second escalation agent runs a query to extract the email addresses of all hospitals and general practitioners' surgeries in the affected areas and emails them with information concerning the outbreak that has been identified in their area.

As illustrated in Table 1, a user defines an agent that compares the actual number of new outbreaks to an agreed upper limit.

TABLE 1

| | Definitions | | | | | | | | | |
|---|---|---|---|---|---|---|---|---|---|---|
| | Number of cases reported | | | | | | | | | Cumulative |
| Laboratory reports | Area 1 Actual | Area 1 Limit | Area 2 Actual | Area 2 Limit | Area 3 Actual | Area 3 Limit | Area 4 Actual | Area 4 Limit | Total cases Feb. 05, 2002 | total to 05-Feb |
| *Campylobacter* | 637 | 750 | 1000 | 900 | 561 | 600 | 985 | 900 | 3183 | 3743 |
| *Escherichia coli* O157* | 1 | 5 | 4 | 5 | 3 | 5 | 4 | 5 | 12 | 14 |
| *Salmonella* | 156 | 200 | 181 | 240 | 176 | 160 | 143 | 240 | 656 | 832 |
| *Shigella sonnei* | 8 | 20 | 24 | 30 | 14 | 20 | 7 | 20 | 53 | 60 |
| Rotavirus | 120 | 300 | 620 | 500 | 170 | 300 | 459 | 500 | 1369 | 1469 |
| SRSV | 21 | 150 | 151 | 200 | 39 | 150 | 92 | 200 | 303 | 332 |
| *Cryptosporidium* | 54 | 100 | 72 | 150 | 28 | 100 | 140 | 150 | 294 | 339 |
| *Giardia* | 41 | 65 | 102 | 100 | 36 | 50 | 112 | 100 | 291 | 339 |

From Table 1, it appears that there are suspicious outbreaks of *campylobacter* in Area 2, *campylobacter* in Area 4, *salmonella* in Area 3, rotavirus in Area 2, *giardia* in Area 2, and *giardia* in Area 4.

These results are passed across to the first escalation agent. This agent is programmed to initiate a series of reports based on the incoming values, as illustrated in Table 2.

TABLE 2

| | Sample Results | | | | | | |
|---|---|---|---|---|---|---|---|
| Area | Organism | Place of outbreak | Month of outbreak | No. ill | Cases positive | Suspect vehicle | Evidence |
| Area2 | *Campylobacter jejuni* | Nursery | Dec-01 | 2 | 2 | None | — |
| Area2 | *Campylobacter jejuni* | School | Not stated | 3 | 3 | None | — |
| Area2 | *Campylobacter jejuni* | Retailer | Dec-01 | 103 | 62 | Cooked chicken and turkey | M, D |
| Area2 | *Campylobacter jejuni* HS13, PT1 | Restaurant | Dec-01 | 8 | 6 | Chicken liver pate | D |

The results are further passed to a second escalation agent that queries a contacts database to obtain the email addresses of health authorities in the affected areas such as "SELECT email FROM contacts WHERE area='AREA2'", and merges the results into a series of messages.

Therefore, by simply extending agent escalation capability by passing control from one agent to the next, and passing any data along with it, a natural mechanism and structure exist to provide data perspective. Agent workflow is the process of chaining multiple agents together with parameter passing. An agent workflow user interface may be provided to make the escalation process usable. The recipient agent can also be another business application that performs further processing, the results of which may be intercepted by other agents.

To effectively manage an event, the event management system 100 is capable of monitoring outcomes, including elements such as support for message acknowledgements to determine whether recipients have received notifications, determining whether an event still exists after an appropriate interval—during which corrective action should have taken place. Referring to FIG. 1, an external system 132 may interact with the server 102 through a Java Database Connectivity (JDBC) 134.

Agent may cause action being taken to modify the behavior 220 by modifying the rules 224 or the schedule 226, or store results in the event store 118.

It is therefore possible to update the event definition according to actual results. For example, if in a plant where the manufacturing process is sensitive to sudden large volume orders, orders in excess of 5,000 items with the current capacity are likely to be an issue. Therefore, large orders are set to be detected, in this case greater than 5,000 items. When such a large order occurs, the information is fed into a manufacturing planning model to determine the effect on lead times. If the model predicts excessive lead times, the appropriate actions will be advisable. In addition, output from the model may revise the definition of a large order to be orders in excess of 2,500 items will now cause impact on the manufacturing plan. Hence, the definition of a large order is dynamically redefined, or tuned to be 2,500 items.

Tuning is where the agents intercepting a given event are dynamically modified to take account of recent events and activities. It is possible to modify an agent's schedule on event detection, to avoid, for example, spamming. An agent that normally runs every hour can be delayed once it has detected an event and sent an initial message to allow the recipient time to respond to the alert. However, there are occasions when it would be useful to modify an agent's behavior if it fails to detect an event. For example, a successful agent may launch an escalation agent whose task is to check for successful resolution of the original problem and to escalate the problem if not cleared up within a certain period. If the original problem is fixed, the escalation agent will be terminated.

Autonomous dynamic modification of agent behavior may be used to change the schedule or conditions of an agent based on one or more previous executions. An agent's normal schedule may be modified when it detects an event. For example, the agent may be stopped after sending a message, or it can be suspended for a period of time, allowing time for the triggering condition to be rectified. If on resumption of the agent, the original condition is still true a further message can be sent.

Recipients of messages can have access to multiple delivery channels. Moreover, a recipient may have more than one 'address' within a delivery channel, such as a business and a private e-mail address. The event management system 100 can determine the most appropriate delivery mechanism for a particular message. The agent is capable of selecting the current address, based upon the recipient's personal delivery schedule.

In some cases, when an agent is being created it is known in advance who the recipient will be, such as a known function. However, often recipients will only be known based on the information ultimately determined.

Some messages may therefore need to be dynamically addressed i.e. the actual recipient information is only determined at runtime based on the result of the query Sometimes, the recipient of a message is determined by the outcome of the rule. For example, if an agent is created to send a message to all customers whose payments are 60 days overdue, the recipients are not known until the agent has completed the query. For cases like this, a message can be addressed dynamically.

With dynamically addressed messages, the system creates a separate message for each addressee containing their relevant information. For example, a message addressed to [Sales Exec Name] containing the line "Congratulations! You have achieved sales of [Sales Value], exceeding your monthly target of [Sales Quota]". This can provide a message being sent to each of the sales executives in [Sales Exec Name] who has achieved sales [Sales Value] in excess of their monthly target [Sales Quota], containing a single line detailing the recipient's own sales figures and targets.

With dynamic message addressing, the delivery address is part of the query. For example, suppose a notification is based on the receipt of a tech support call from one of the top 20 customers. The notification is to be sent to the account manager of the caller. In this case, the addressee is determined by the event. The email address is itself a variable rather than a pre-determined literal value.

An event management system has the potential to generate a multitude of messages. The recipients of those messages may have self-subscribed or have been added by other users of the system.

To assist a system administrator in identifying the source and destination of all messages, auditing is provided. The auditing may include the actual email addresses of all recipients of each message, the identity of any person subscribing, unsubscribing, or adding or deleting other recipient names to a message either through the agent user interface or through the 'unsubscribe by replying to an email' option. Auditing further includes the scheduled, actual and next run-times, and the result of each execution.

Multiple schedules for an agent may be added. For example, a report can be run every Friday and on the last day of the month. Individual recipient can customize it so that notifications can be re-directed to a facsimile machine, printer, hard line phone, cell phone, or wireless device. One address may be set as the default address so that, should a user have edited the delivery schedules so that no address is active when an event is detected, the message will be sent to the default address. This avoids the necessity for the system to hold messages until such time as an active address is available.

Contextual drill through is an OLAP technology which provides navigation without the need to understand the underlying complexities of the data. After deciding an event is significant and requires action, processing and further action for the significant event will be decided. A significant event may have various degrees of significance and therefore may involve a variety of people and processes.

Processing in the contextual drill through may include writing information to a repository that can contain a history of important events to modifying the behavior of the event absorption layer, also known as tuning.

For example, if a company is concerned with improving the performance against customer service level agreements (SLA), in particular, order fill rate, one may want to identify when incomplete orders are being processed from certain customers, i.e. the ones already running a poor order fill rate. Therefore it would be beneficial to pursue a primordial event further in cases where the order fill rate has gone below that which was agreed upon in an SLA.

It may be that the event absorption layer is only picking off orders of a 'sales' type. A filter in the event absorption layer is used to reject those orders that don't have back ordered quantities, passing through orders that do. The event processing and filtering layer takes the event of potential interest from the event absorption layer—the primordial event—and decides if it is a significant and actionable event. In this case, for example, is the customer order below the order fill rate SLA? A significant event may be further considered in the context of other data, available to the organization; in this case a store of service level agreements. This concept is also referred to as applying a data perspective.

The final outcome of this compound layer is either an event of significance to be actioned, or an event that has been rejected. Significant events together with required actions are passed on to the final layer, or event delivery and display.

Once an event has been identified as being significant and the required actions identified, it needs to be communicated that a significant event has occurred.

In a prospective enquiry, the prospect may be profiled against some standard prospective customer profile. Data analysis and modeling may be used to provide the data perspective to decide if the primordial event is a significant actionable event, if so to determine the subsequent actions to be taken.

An agent runs according to a schedule that defines its start and end dates/times and the frequency with which it runs within them. If an agent fails to detect an event, it will simply terminate and be reactivated at its next scheduled run time.

The event management system 100 includes a central repository of objects 118, such as definitions of data sources, mappings, and/or recipients, held within a relational database system. The server component 102 is responsible for performing tasks automatically, while maintaining a connection to the repository, and storing and retrieving objects. The server component 102 also runs the scheduler 126, which is responsible for initiating each agent at the appropriate time, as well as the agents themselves. The server component 102 activates the business agents at user defined times and frequencies, which are assigned to each individual agent. The server component 102 also handles assembly and transmission of messages.

The server component 102 may be connected to one or more clients running user-interface components that enable users to create and edit various objects and to schedule agents.

For example, the delivery address may be customized by the recipient so that the recipient can always be found, and the notification is delivered in an appropriate format. The recipient may further unsubscribe from existing notifications, or instruct to execute further agents. The a user to temporarily may further re-direct all emails to another user.

Figure 4:
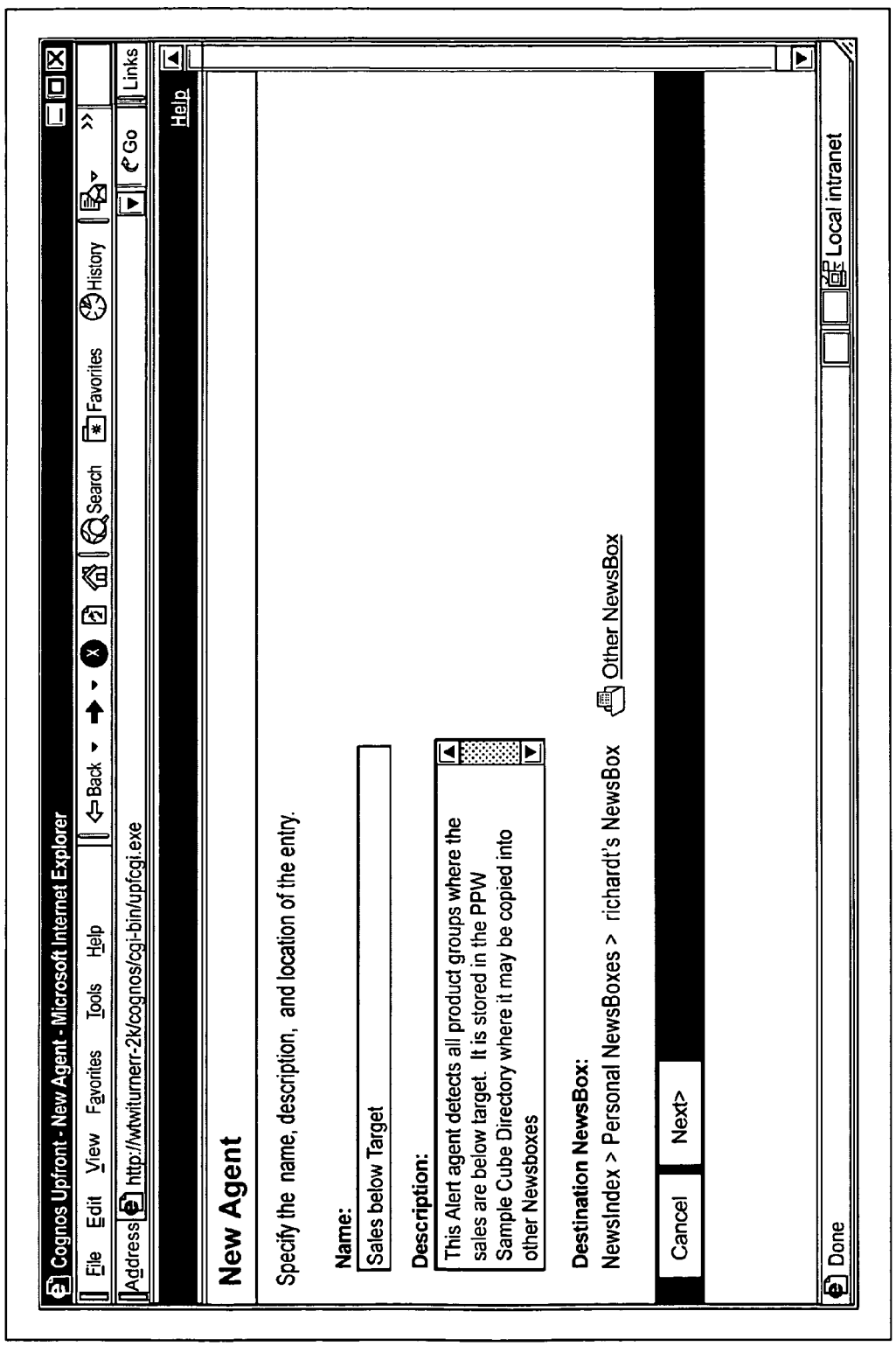
FIG. 4 illustrates an example of authoring an agent.

FIG. 4 illustrates an example of creating a new agent in a client application. Agents authored in the client may be published, enabling users to subscribe to published agents, add their names to the recipient list, create custom views of new messages, and modify schedules.

Figure 5:
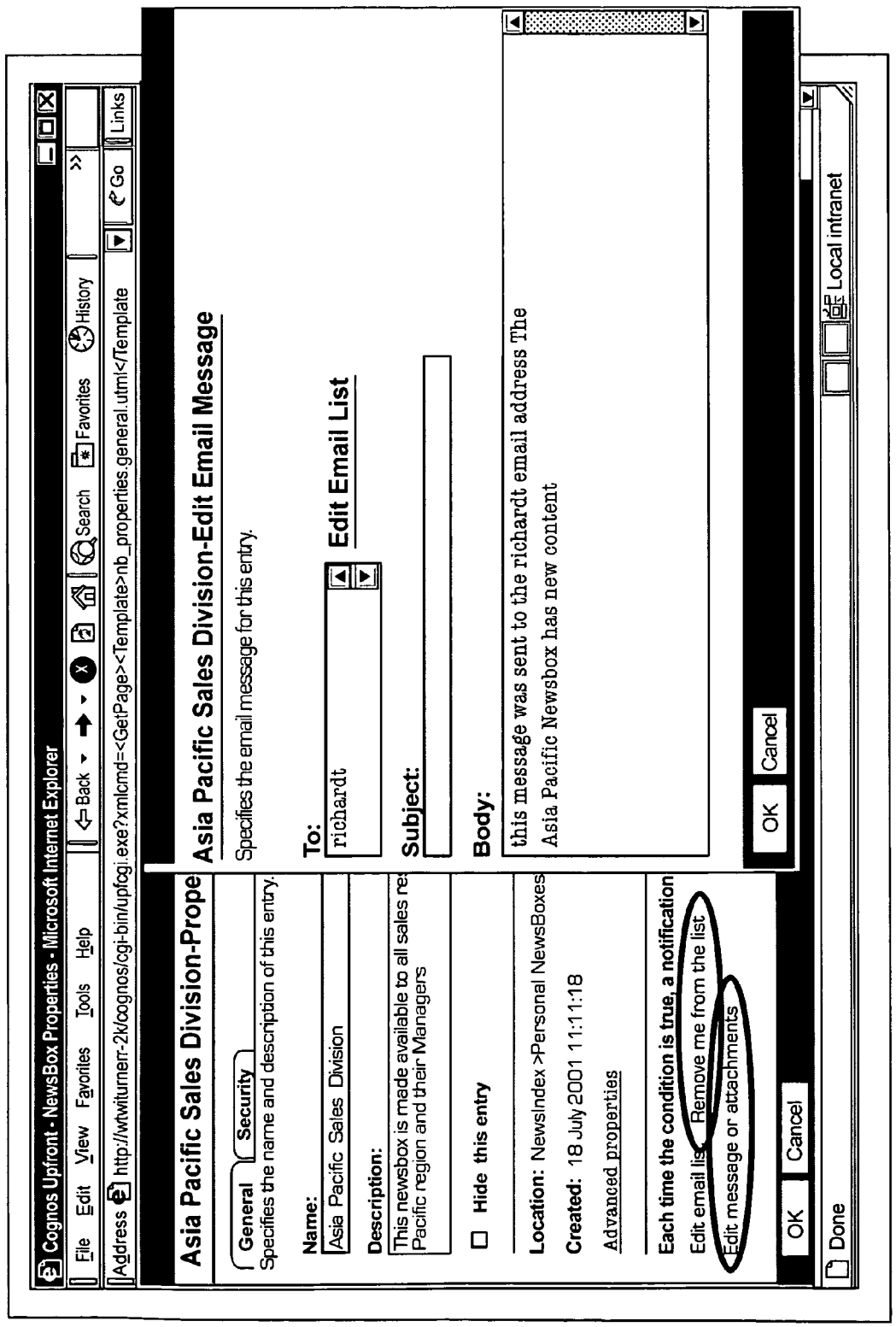
FIG. 5 illustrates another example of authoring an agent.
Figure 6:
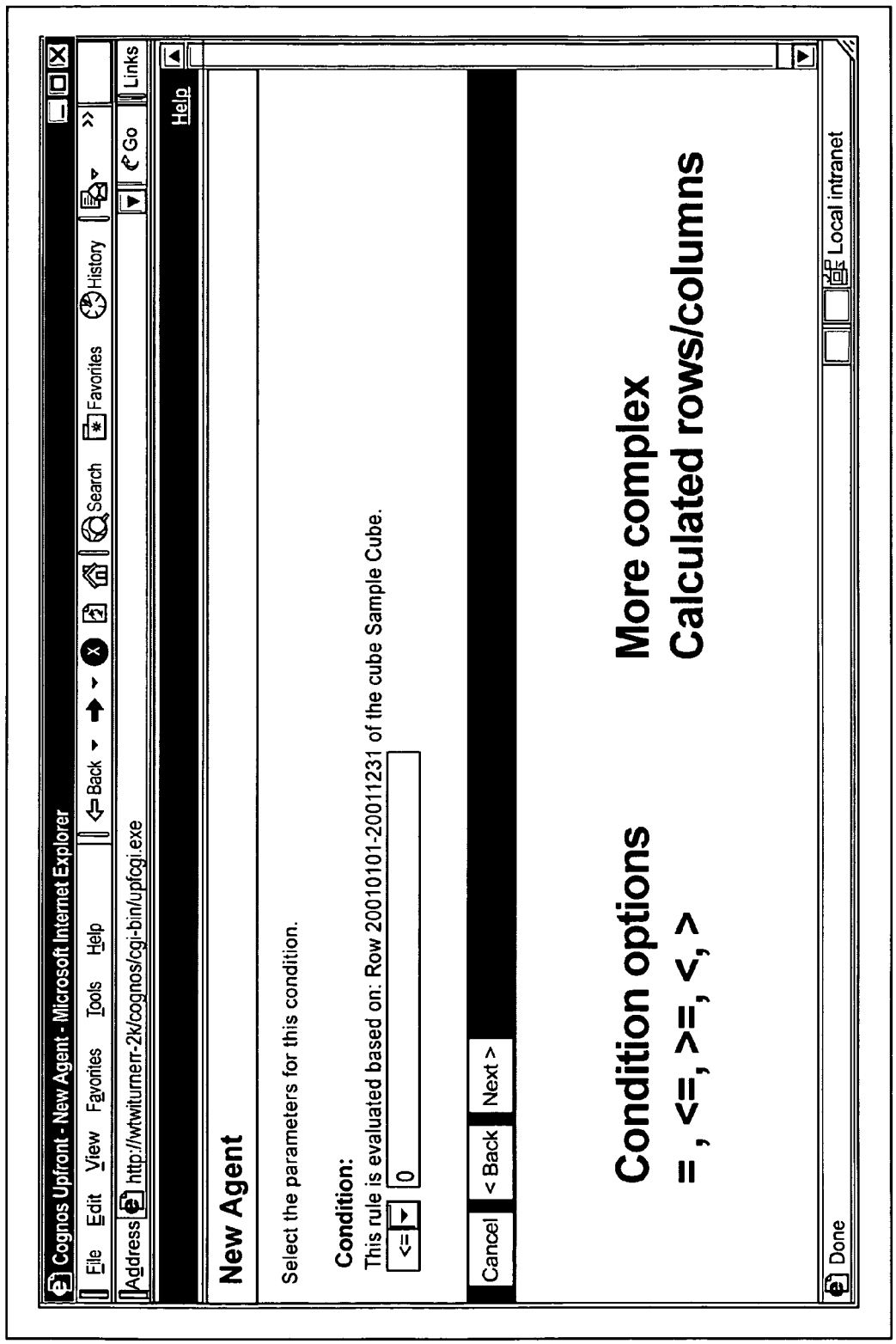
FIG. 6 illustrates another example of authoring an agent based on conditions.
Figure 7:
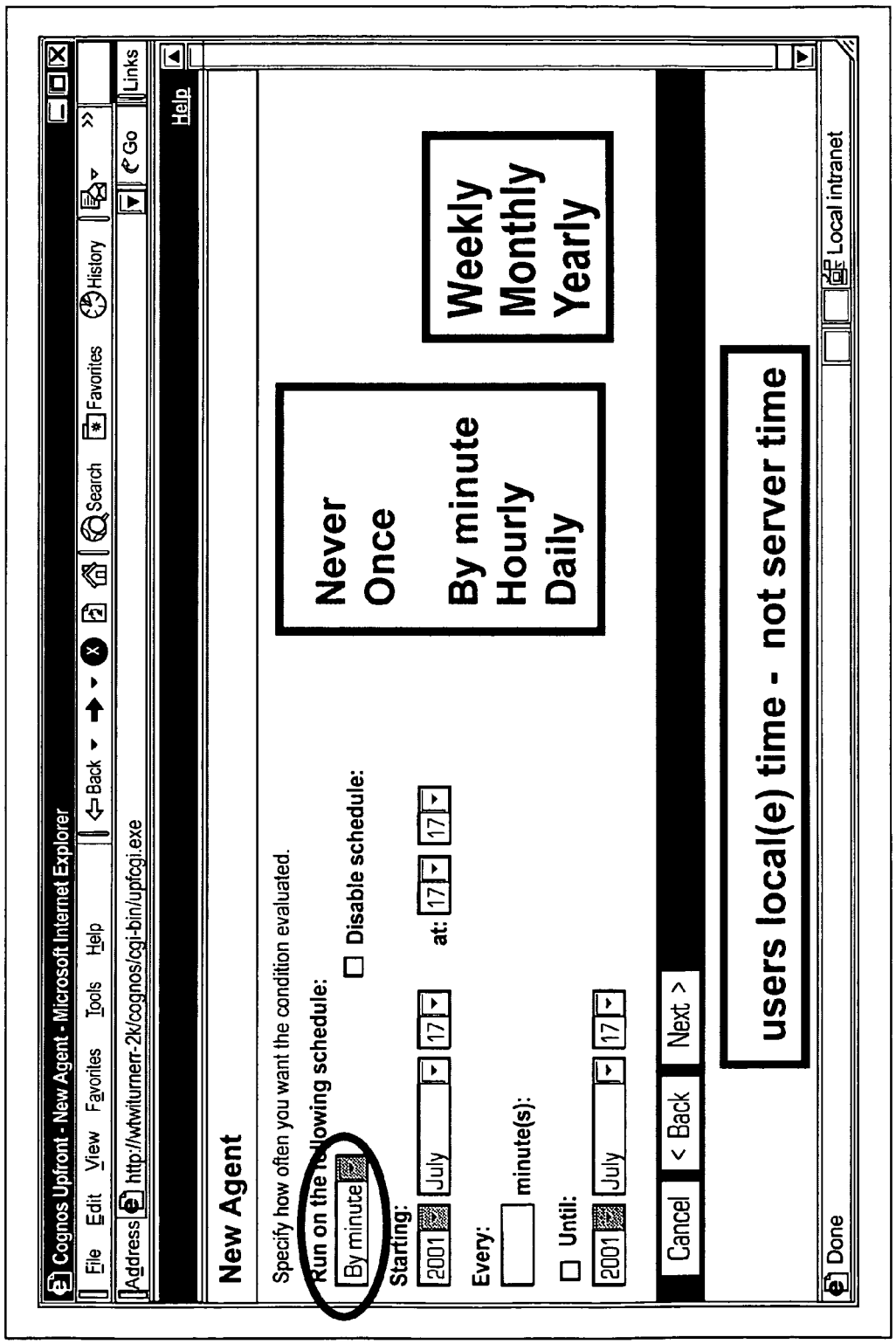
FIG. 7 illustrates another example of authoring an agent based on frequencies.

FIG. 5 shows another example of a notification agent in an application. FIGS. 6 and 7 are two examples for the conditions and schedules of an alert agent.

Figure 8:
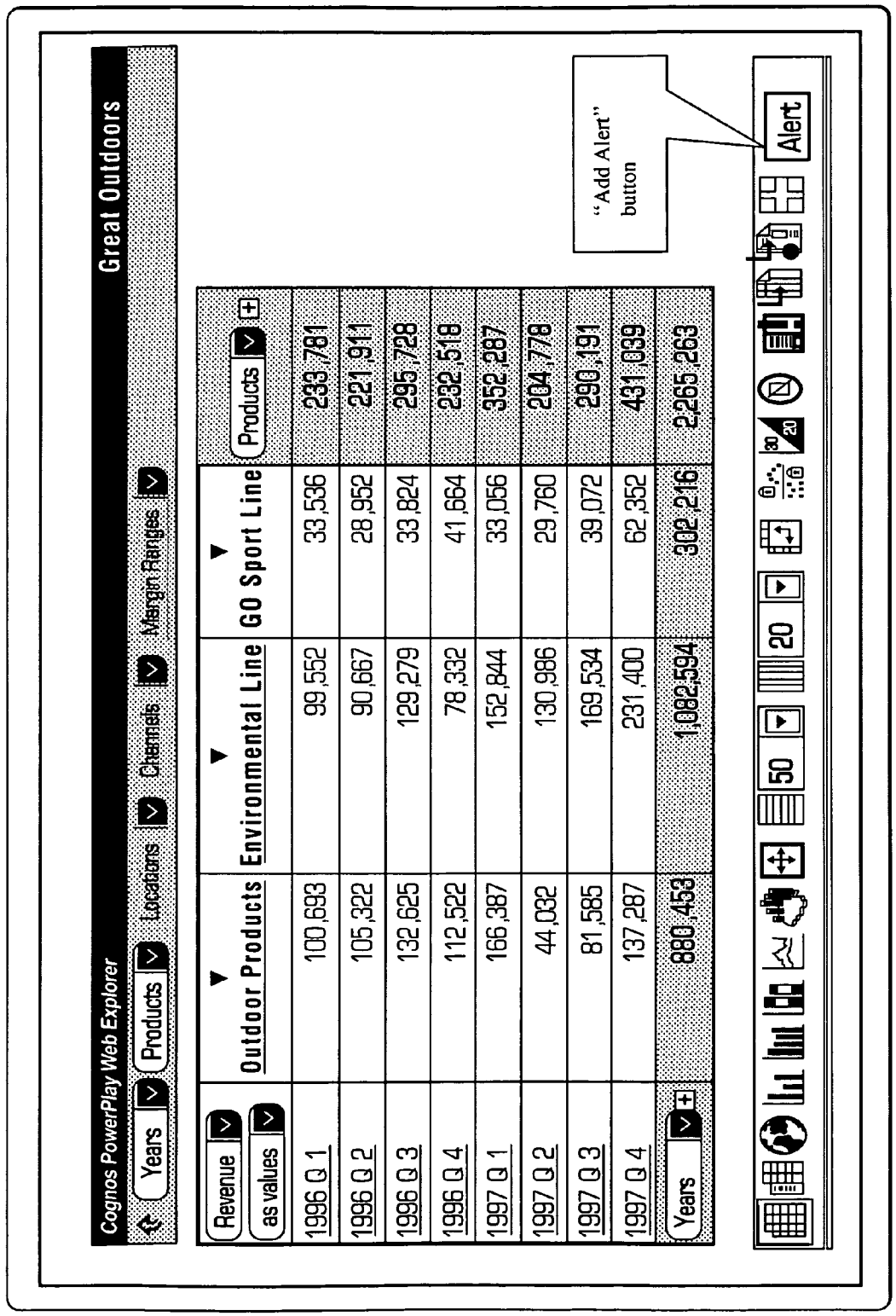
FIGS. 8 and 9 illustrate examples of creating agent in existing applications.
Figure 9:
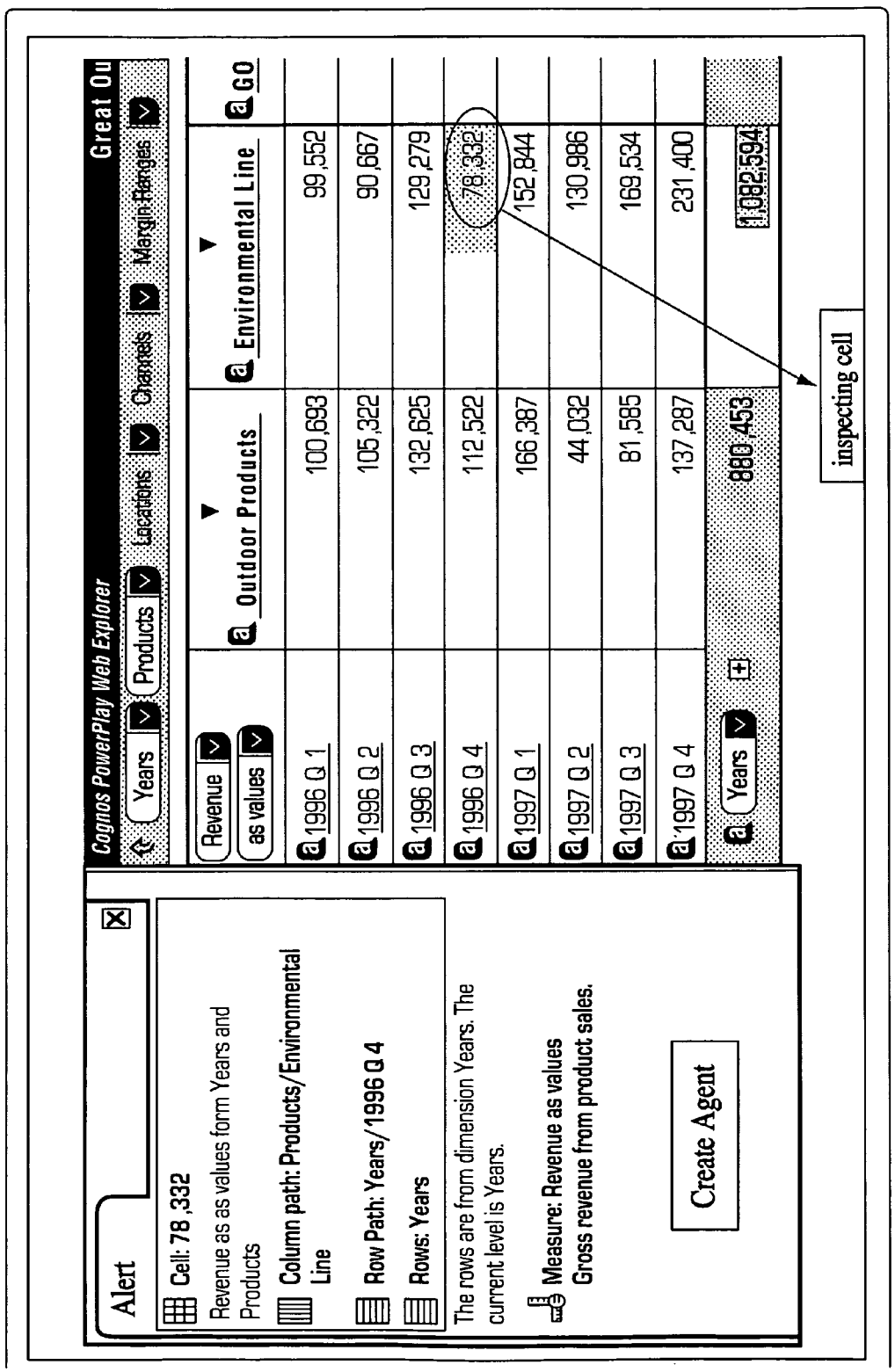

Referring to FIGS. 8 and 9, the event management system 100 can be integrated into a spreadsheet program with the addition of a new "Add alert" button will have provided on a toolbar. A user may select any single cell, single row or single column and then activates the provided "Add alert" button to start an agent wizard. The wizard then prompts for a field entry such as agent name, agent description, rule, agent schedule, recipients, and the message format and content to be sent, Data sources can be personalized. Filters are provided to remove unwanted elements.

When creating a message, the measure and dimensions associated with the selected cells may be listed. These measures and categories can be included as placeholders within the message body so that at runtime, the actual values of measures and categories satisfying that rule can be inserted within the body of the message.

Figure 10:
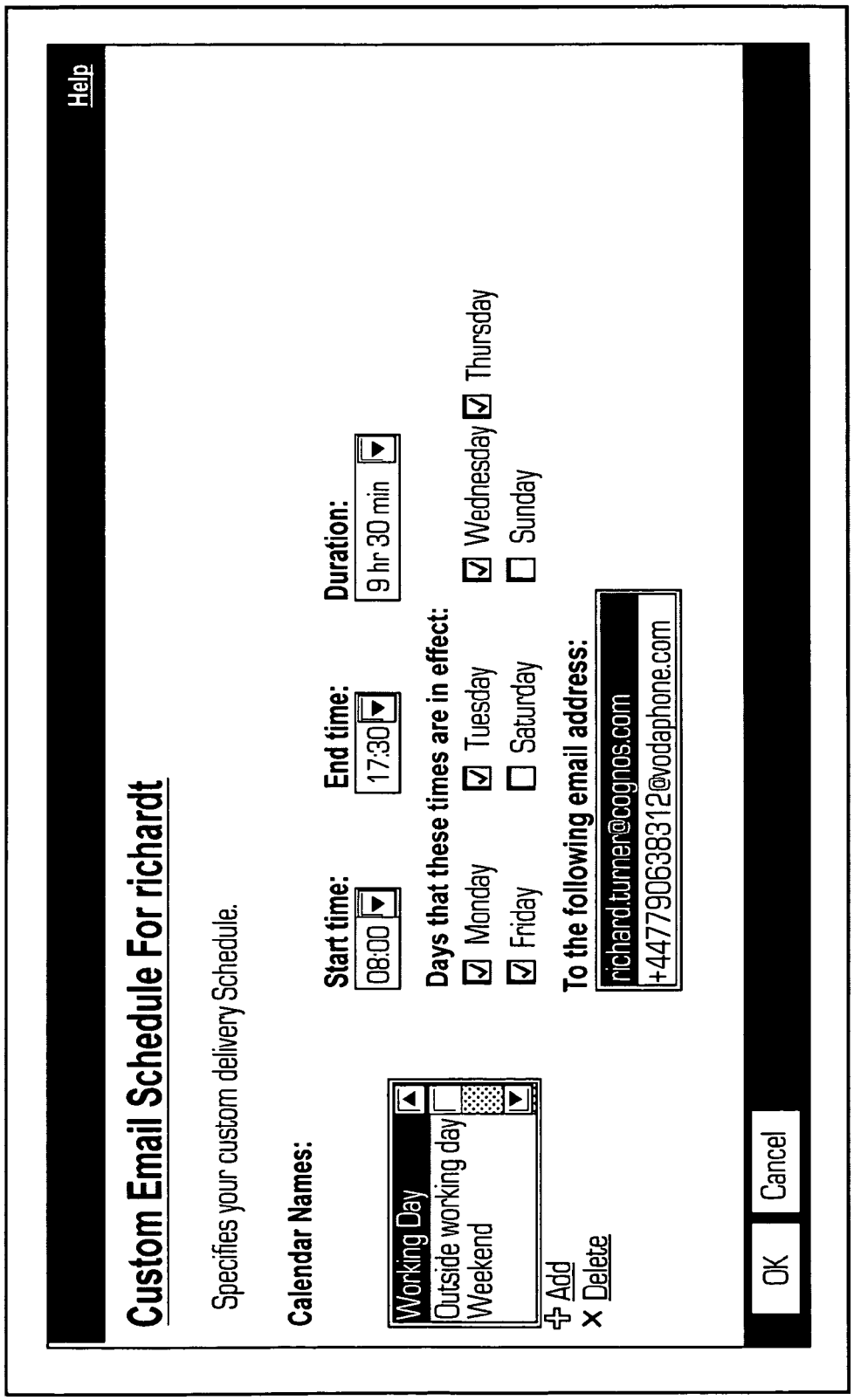
FIG. 10 illustrates an example of personalization of a delivery schedule.

Referring to FIGS. 2 and 10, users may schedule 226 when an agent is to be run. The schedule may initially set within an agent wizard. It can then be subsequently changed from the agent's properties schedule page.

Figure 11:
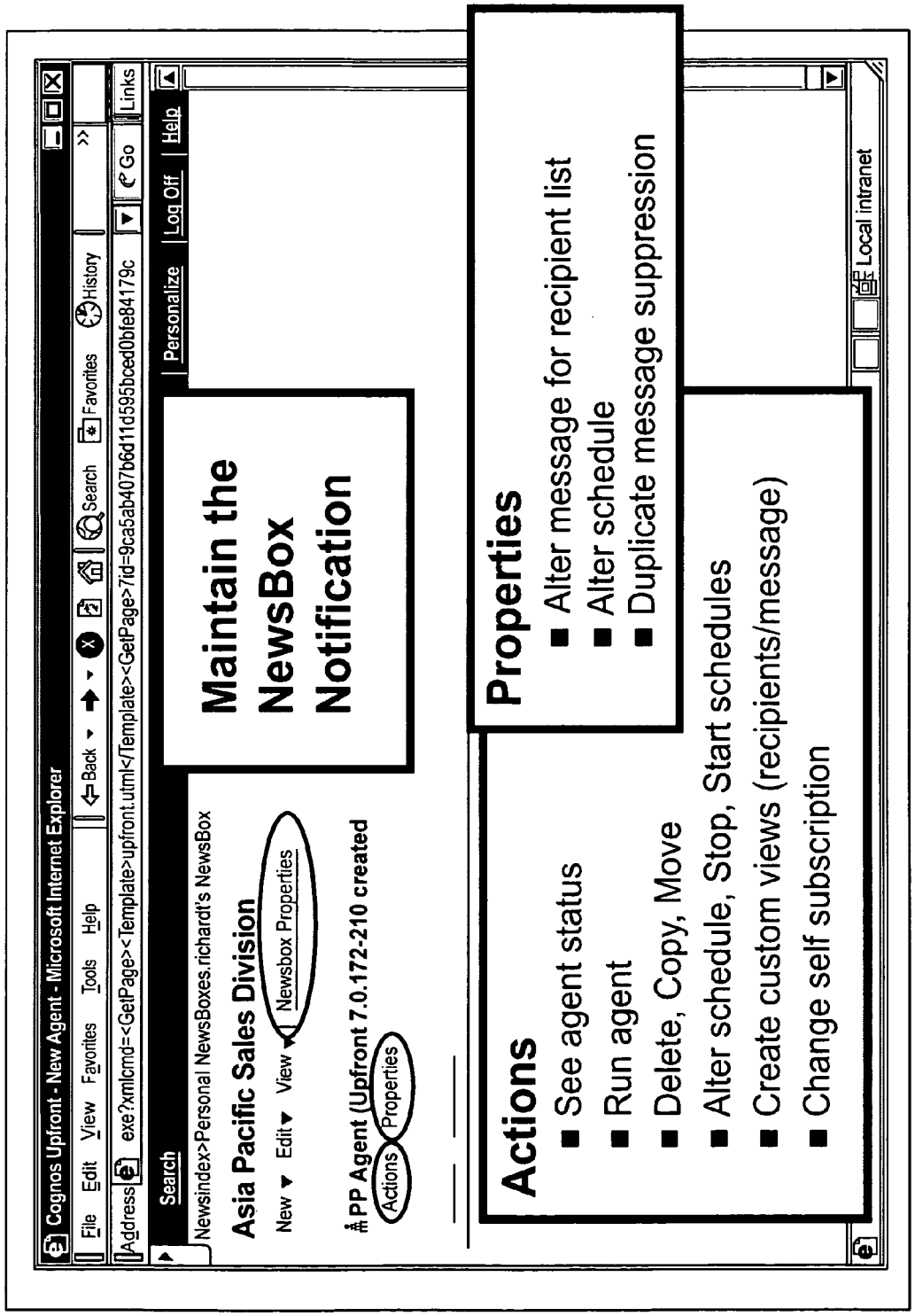
FIGS. 11 to 13 illustrate examples of maintaining an agent.
Figure 12:
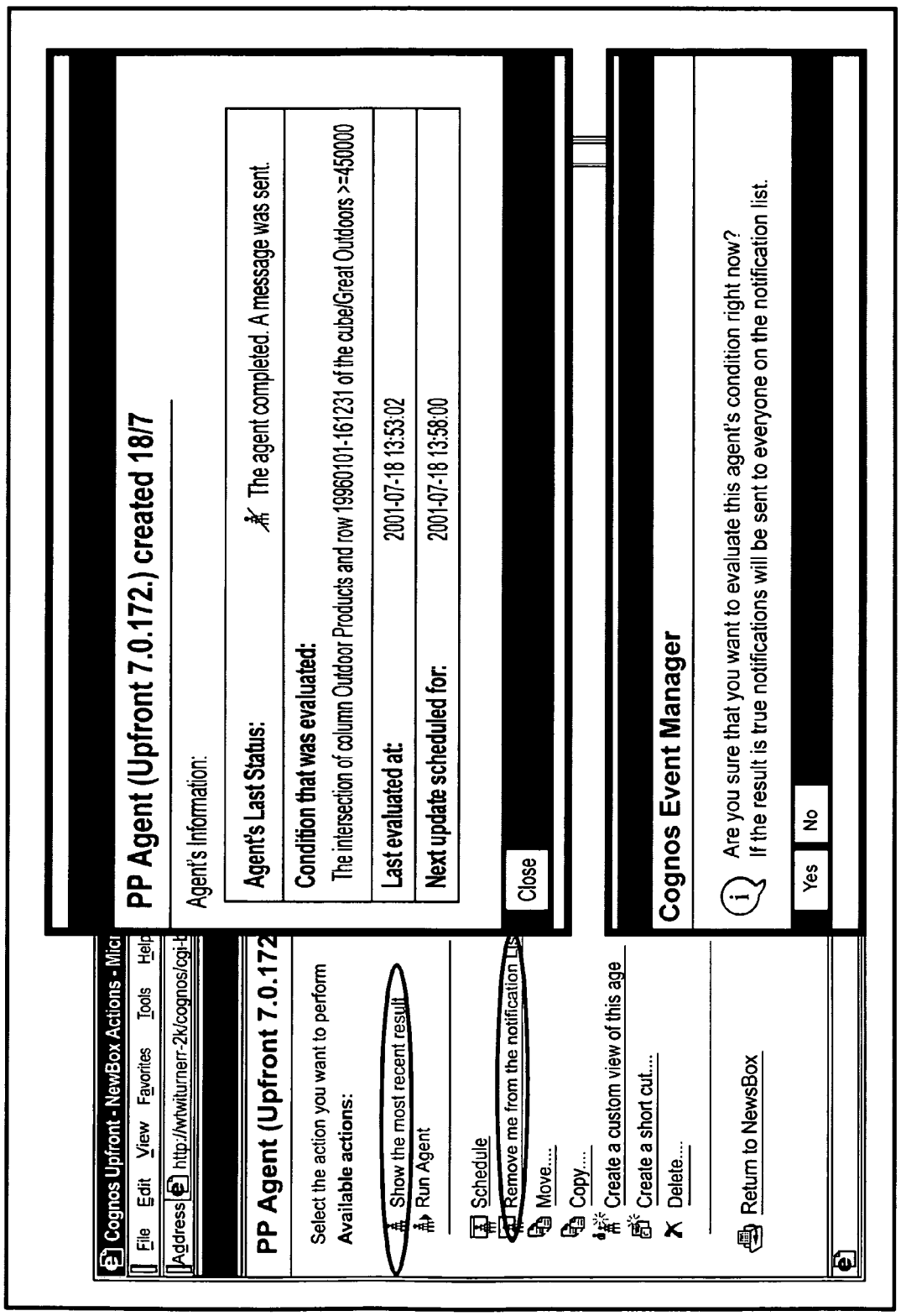
Figure 13:
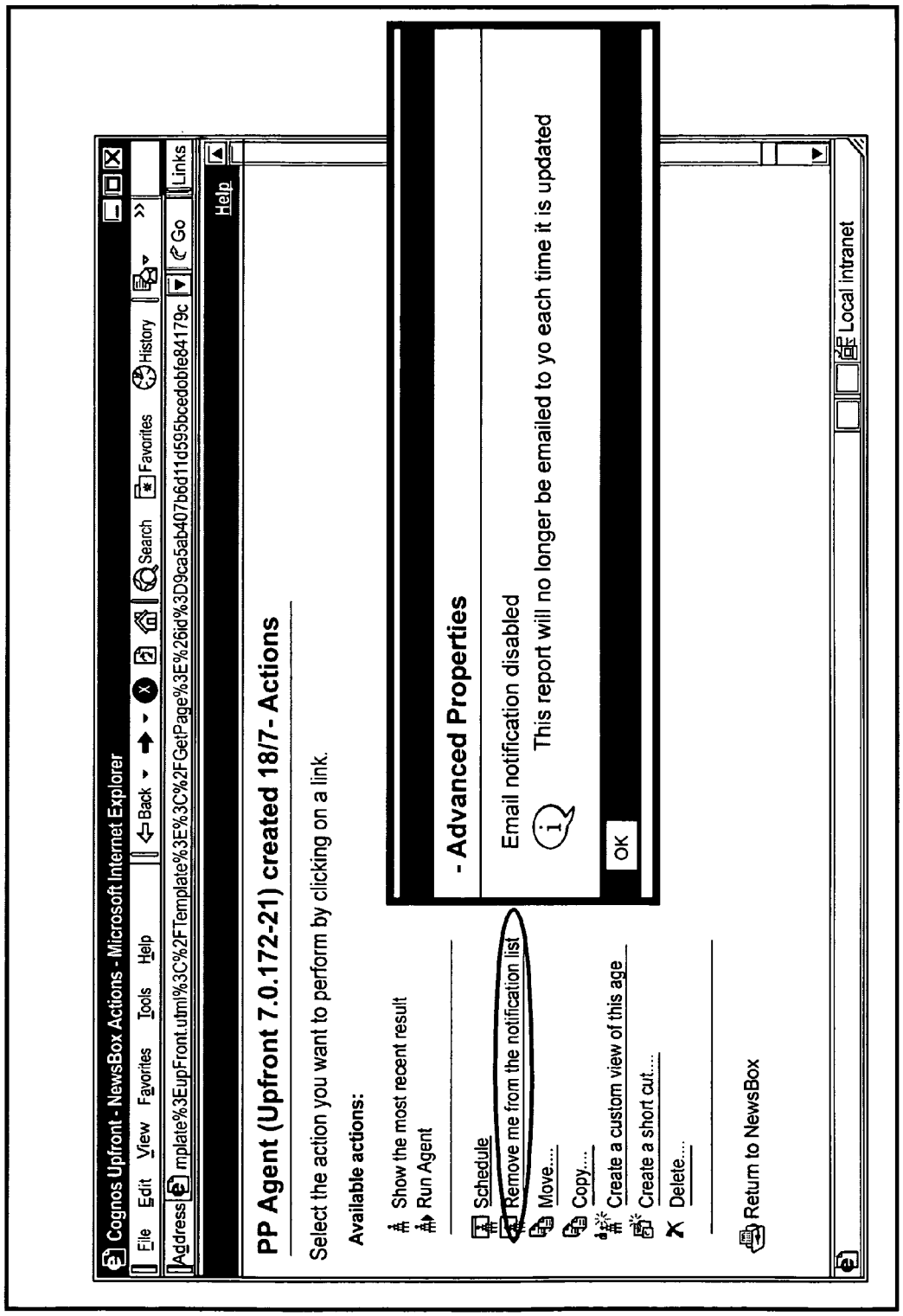

Once an agent is created, it can be maintained through a user interface of a dedicated application, or as a menu of an existing application such as Cognos Upfront® as shown in FIGS. 11, 12 and 13. The maintenance may include the actions such as checking agent status; run agent; delete, copy, move and shortcut; change, start and stop schedules; create custom views; change self subscription; and set personal delivery schedules. FIG. 11 illustrates the maintenance of actions and properties. FIG. 12 shows an example of the user interface showing the last status. FIG. 13 illustrates that a user can be removed from the maintenance window. A user wish to unsubscribe an agent, can also reply to the message sent with the word "unsubscribe".

Figure 14:
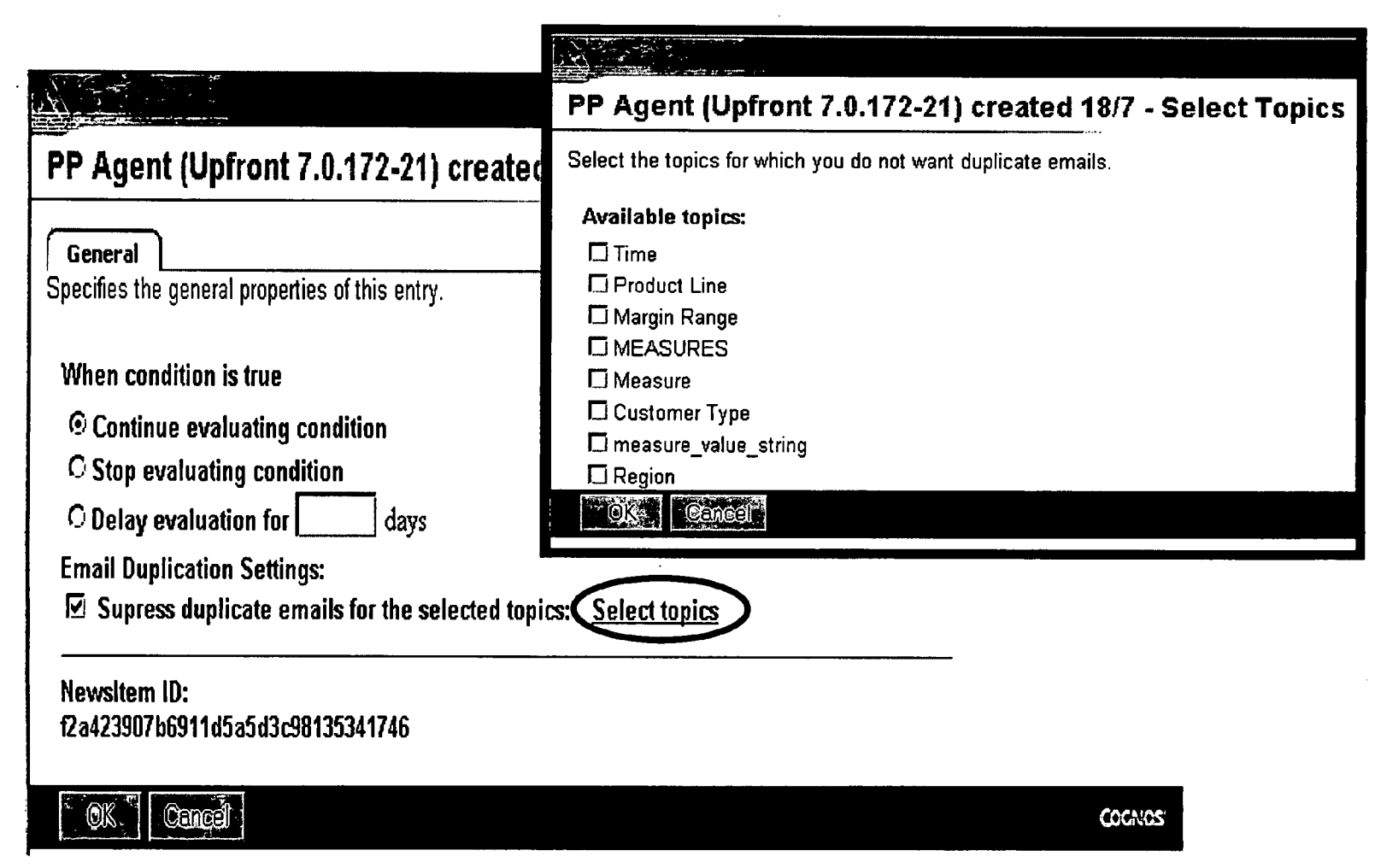

FIG. 14 illustrates an example of suppression of duplicate emails based on selected topics.

The system can conform to an existing security model to provide a common sign-on so that a user need only log-on once. Each user's access permission is controlled by their membership in a user class defined within the existing security model. Access to system objects can then be controlled in accordance with an individual's user class membership.

An event management system has the potential to generate a multitude of messages. The recipients of those messages may have self-subscribed or have been added by other users of the system. Other messages may be, as described above, 'dynamically' addressed based on the result of the query. To assist a system administrator in identifying the source and destination of all messages, the system may provide auditing, for example auditing of the actual email addresses of all recipients of each message, the identity of any person subscribing, unsubscribing.

Multiple rules per agent are provided as a standard feature in the client and can be achieved by selecting multiple filter conditions in queries. When an agent contains two or more rules, the conditions are "ANDed" together. A user may also create aggregate rules, using either AND or OR operators, making it possible to create agents that detect conditions such as "Europe AND Potatoes" OR "Asia AND Rice".

The event management system 100 can monitor operational events across multiple processes since the architecture enables the "joining together" of disparate systems, and can provide support for managers with responsibilities that cross several processes. The event management system 100 enables agents to be defined in a manner that enables them to cross multiple systems.

Some messages may need to be addressed dynamically, that is, the actual recipient information is only determined at runtime based on the result of the query. For example, when a budget figures slips based on activity as to which addressee is to be used. The relationship of the data received to a provided subset of addressees can be determined at a later time. For example, an event is now vanished since "range of play time" has expired. Therefore, while one may know in advance who the recipient will be when an agent is being created, often recipients will only be known based on the information ultimately determined. In other words, the recipient of a message is determined by the outcome of the rule.

Figure 15:
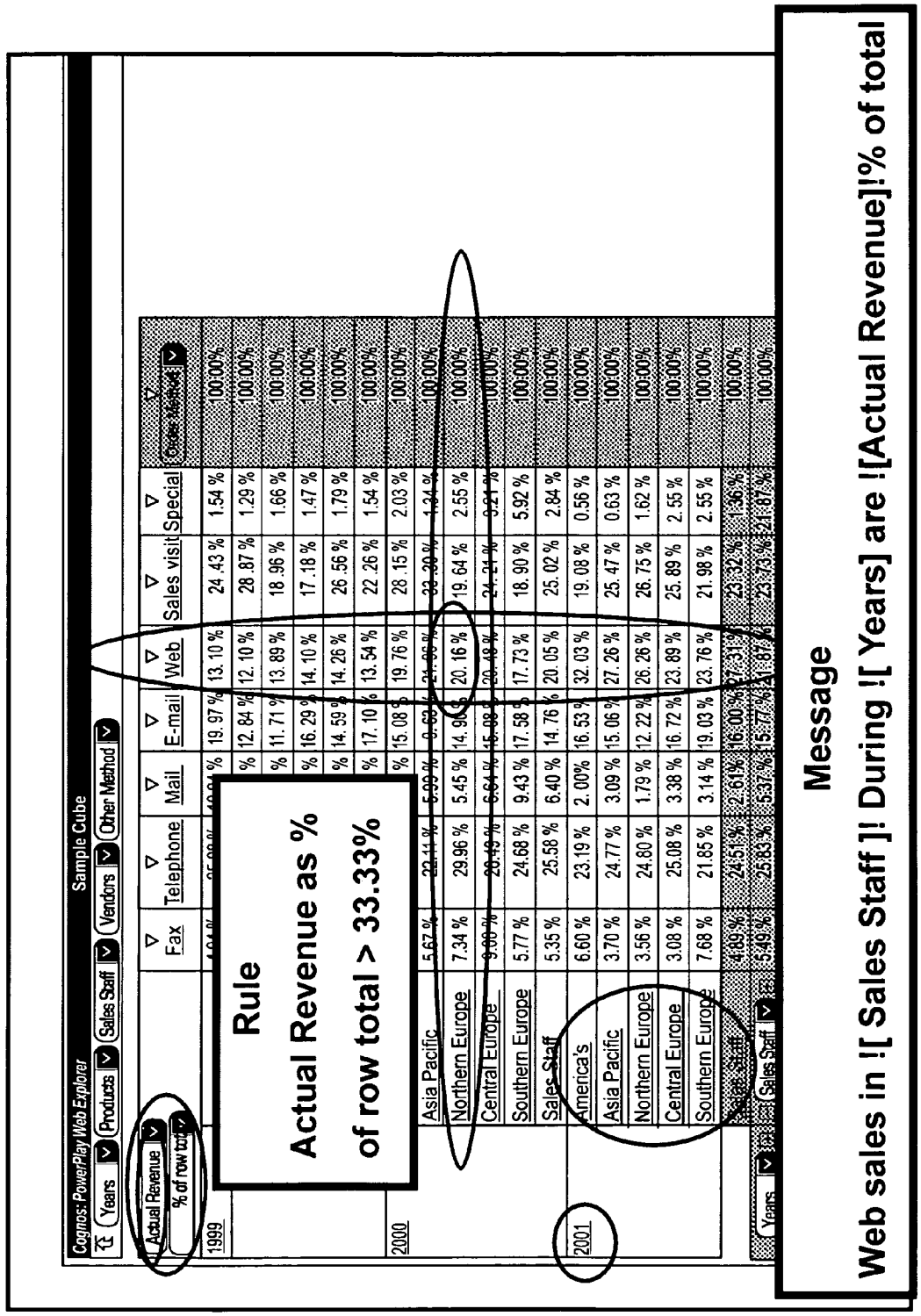
FIG. 15 illustrates an example of a rule used by an agent.

Referring to FIG. 15, a user wants to be alerted when Web sales exceed 33.33% of total sales in any area. The user first selects the Web column and creates an alert based on these elements in the following rule: "Actual Revenue as % of row total >33.33". When creating the message, the measure and levels of actual revenue, years, and sales staff are available for inclusion. The user then creates the message, "Web sales in [Sales Staff] during [Years] have reached [Actual Revenue] % of total sales". When on a data update the proportion of revenue achieved through the web during 2001 increases to 36.4% in the Americas and to 33.5% in Northern Europe, but stays <33.3% in all other areas, a message will be assembled containing the following text: "Web sales in Americas during 2001 have reached 36.4% of total sales. Web sales in Northern Europe during 2001 have reached 33.5% of total sales".

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A method comprising:
creating an agent on a computer server in an event management system to detect an occurrence of an event and notify the occurrence of the event, the agent being software executable, the event occurring when data achieves a predefined status defined by a business rule, the event management system including a data source;
creating an escalation agent on the computer server, the escalation agent being software executable;
running the agent according to a schedule;
generating a notification upon occurrence of the event as detected by the agent;
responsive to occurrence of the event, launching the escalation agent by the agent responsive to the detection of the event by the agent, wherein the agent launches the escalation agent, and wherein the launching of the escalation agent results in a separate agent process that runs according to its own pre-defined schedule;
passing event data associated with the event from the agent to the escalation agent after the escalation agent has been launched by the agent;
passing control from the agent to the escalation agent upon passing of the event data to the escalation agent;
terminating execution of the agent after control has been passed by the agent to the escalation agent;
generating an escalation message by the escalation agent if the escalation agent determines that the event previously detected by the agent still exists after a period of time subsequent to control being passed from the agent to the escalation agent; and
terminating execution of the escalation agent if the event previously detected by the agent does not still exist after the period of time subsequent to control being passed from the agent to the escalation agent.

2. The method of claim 1, further comprising:
storing values from the notification in an event data store;
comparing values from a second notification to the stored values from the notification, and
suppressing the second notification when there is a predetermined element match.

3. The method of claim 1 further comprising:
storing event data from a plurality of events in an event store;
analyzing the stored event data, and
determining one or more trends.

4. The method of claim 1, further comprising:
updating the business rule that is used by the agent to detect an occurrence of a subsequent event based on the occurrence of the event.

5. The method of claim 1, further comprising:
changing the schedule of the agent based upon the occurrence of the event by suspending the agent for a period of time.

6. The method of claim 1 further comprising:
inserting a dynamic addressee placeholder into the notification;
retrieving a second data from the data source;
determining a dynamic addressee based on the second data;
inserting an address of the determined dynamic addressee into the dynamic addressee placeholder; and
transmitting the notification to the addressee.

7. The method of claim 1 further comprising:
filtering a plurality of events resulting in a significant event; and
deciding an action for the significant event.

8. The method of claim 7 wherein the significant event is filtered through an event absorption layer and decided in an event processing and filtering layer.

9. The method of claim 1 further comprising:
customizing a delivery address and an appropriate format of the notification by the recipient.

10. The method according to claim 1, wherein the notification is a message.

11. The method according to claim 1, wherein the notification is an electronic mail.

12. The method according to claim 1, wherein the notification further comprises a text message.

13. The method according to claim 1, wherein the notification further comprises support data.

14. The method according to claim 1, wherein the data source is external.

15. The method according to claim 1, wherein the data source is a relational database.

16. The method according to claim 1, wherein the data is extracted according to a data mapping.

17. The method according to claim 1, wherein the notification is sent to another business intelligence system to run another application.

18. A computer-readable storage device encoding a computer program for causing a computer to:
create an agent to detect an occurrence of an event and notify the occurrence of the event, the agent being software executable, the event occurring when data achieves a predefined status defined by a business rule, the event management system including a data source;

create an escalation agent, the escalation agent being software executable;

run the agent according to a schedule;

generate a notification upon occurrence of the event as detected by the agent;

responsive to occurrence of the event, launch the escalation agent by the agent responsive to the detection of the event by the agent, wherein the agent launches the escalation agent, and wherein the launching of the escalation agent results in a separate agent process that runs according to its own pre-defined schedule;

pass event data associated with the event from the agent to the escalation agent after the escalation agent has been launched by the agent;

pass control from the agent to the escalation agent upon passing of the event data to the escalation agent;

terminate execution of the agent after control has been passed by the agent to the escalation agent;

generate an escalation message by the escalation agent if the escalation agent determines that the event previously detected by the agent still exists after a period of time subsequent to control being passed to the escalation agent; and terminate execution of the escalation agent if the event previously detected by the agent does not still exist after the period of time subsequent to control being passed from the agent to the escalation agent.

19. The computer-readable storage device of claim 18, wherein the computer program further causes the computer to:

change the schedule of the agent based upon the occurrence of the event by suspending the agent for a period of time.

* * * * *